No. 609,283. Patented Aug. 16, 1898.
W. N. LONG.
COUPLING.
(Application filed Mar. 3, 1898.)
(No Model.)
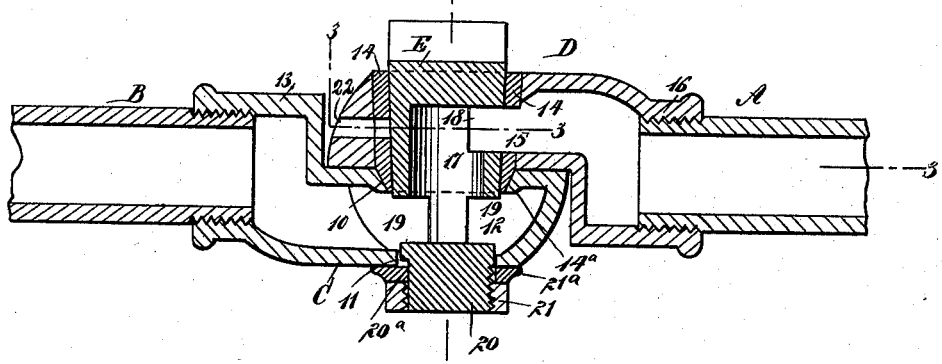
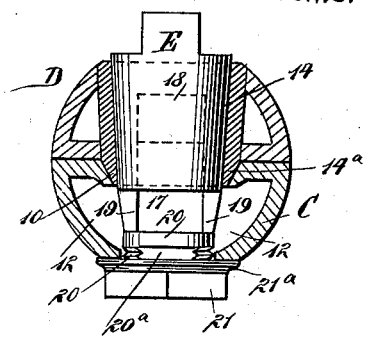
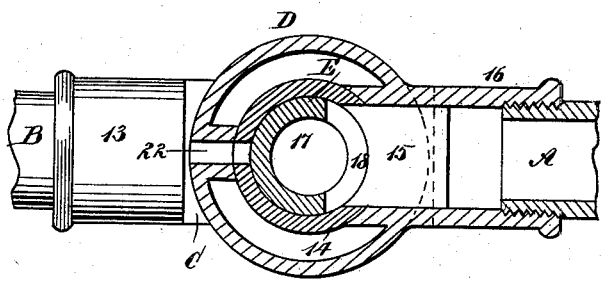
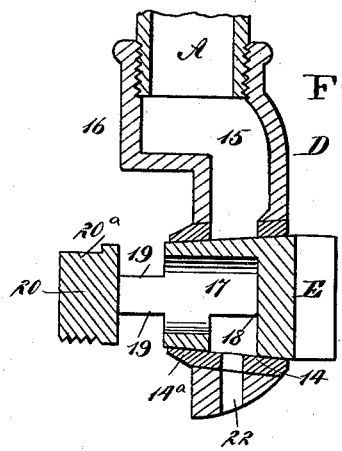
WITNESSES:
Donn Twitchell
Jnd. Acker
INVENTOR
W. N. Long.
BY
ATTORNEYS.

UNITED STATES PATENT OFFICE.

WILLIAM N. LONG, OF SALEM, OREGON, ASSIGNOR OF ONE-HALF TO JOSEPH S. PARKER, OF SAME PLACE.

COUPLING.

SPECIFICATION forming part of Letters Patent No. 609,283, dated August 16, 1898.

Application filed March 3, 1898. Serial No. 672,443. (No model.)

*To all whom it may concern:*

Be it known that I, WILLIAM NELSON LONG, of Salem, in the county of Marion and State of Oregon, have invented a new and useful Improvement in Couplings, of which the following is a full, clear, and exact description.

The object of the invention is to provide a coupling in which will be combined a union and stop-cock and an L-fitting and which is especially adapted for use in connecting the pipes leading from a boiler to the water back or coil of a stove or range, enabling a separation to be effected between the water back or coil and the boiler without drawing off the water from the latter.

Another object of the invention is to provide a coupling of the character above described which will be simple, durable, and economic and capable of being applied by any person of ordinary intelligence.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the improved coupling and pipes with which it is connected, the parts of the coupling being in position to admit the flow of liquid from one pipe to the other. Fig. 2 is a vertical section taken substantially on the line 2 2 of Fig. 1, the key being shown in side elevation. Fig. 3 is a horizontal section taken substantially on the line 3 3 of Fig. 1. Fig. 4 is a horizontal section similar to the section shown in Fig. 3, the members of the fitting, however, being carried at right angles to each other and the key being shown in position to stop the flow of water from one member of the coupling to the other, enabling one of the members to be removed; and Fig. 5 is a section on the line 5 5 of Fig. 4, showing one member of the coupling removed and the other member connected with a pipe and the supply of liquid from said pipe cut off.

A represents a pipe which is adapted to be connected with a house-boiler, for example, and B a pipe which may be attached to the water back or coil in a stove or range, the two pipes being shown as connected by the improved coupling. The improved coupling is made in two members C and D, held to turn one upon the other, and a key E, mounted to turn in both members, the said key being capable of establishing communication between the members or of cutting off said communication, as desired. Each member C and D is preferably of semispherical form. The member C is provided at its top or flat surface with an opening 10, the wall whereof is inclined, and at the bottom of the said member C a registering opening 11 is made, while a chamber 12 is formed within the member C and is in communication with an interiorly-threaded hub 13, formed at one end of the said member C, as is particularly shown in Fig. 1.

The opposing member D is provided with a barrel 14, extending from top to bottom, and said barrel is provided with a branch which is carried to one side of the member D, forming an outlet 15, in communication with an interiorly-threaded hub 16 on the member D, said hub when said members are used to connect a straight line of pipe being at the opposite side of the coupling to the hub 13, the two hubs being in horizontal alinement, as is also shown in Fig. 1. The barrel 14 extends downward below the bottom or flat surface of the member D of the coupling, and the outer surface of the said extension $14^a$ of the barrel is beveled correspondingly to the bevel of the wall of the opening 10 in the member C, into which opening the projection or extension $14^a$ of the barrel is adapted to enter and turn with a water-tight joint.

The key E may be turned by means of a wrench or other suitable tool and is closed at the top and at the bottom, being provided with an interior chamber 17, having a single outlet 18 at its upper end, adapted to communicate with the outlet 15 of the coupling member D; but at the lower end of the said chamber 17 a double opening 19 is formed, which communicates with the chamber 12 in the coupling member C and with the passage-way leading from said chamber into the hub 13, as is also shown in Fig. 1. The lower end 20 of the key is passed through the opening 11 in the outer or cylindrical portion of the member C and is exteriorly threaded to receive a nut 21, and one side of the threaded end 20 of the key is flattened, as shown at 20ª in Figs. 1, 2, and 5, in order to receive and hold a washer 21ª. The washer is placed between the body of the coupling and the nut and prevents the nut from unscrewing when the key is turned. By slightly loosening the nut 21 the members of the coupling may be so turned that their hubs 13 and 16 will be in alinement or the hubs may be carried to any desired angle relative to each other.

In Fig. 1 I have illustrated the coupling as connecting sections of a straight line of pipe, and the key is turned so that its upper opening 18 communicates with the pipe A and the lower double opening 19 communicates with the chamber in the coupling member C and also with the pipe B, permitting of a flow of water from the pipe A to the pipe B.

In Figs. 4 and 5 I have illustrated the key as turned sufficiently to carry the closed or plain portion thereof opposite the outlet 15 of the barrel, thus cutting off the flow of water from the pipe A to the pipe B. It is therefore evident that if the nut 21 be removed, the key being in the position shown in Figs. 4 and 5, the member C of the coupling may be separated from the member D and that there will be at that time no leakage, thus permitting any repairs necessary to be made on the line of pipe B, and that the member C may be expeditiously and conveniently connected with the member D of the coupling after such repairs have been made.

The adjustable coupling is advantageously used in setting up a boiler and stove or range, being then placed at the top of the boiler, serving as a stop-cock and union. Thus the single fitting serves two purposes. Or the coupling can be used as an L-union and stop-cock when connecting a boiler to a stove or range, the one fitting in this instance serving three purposes, and it is evident that in the event that repairs are needed the coil in the stove or range can be removed, as stated, without drawing the water from the boiler, since by removing one half of the coupling the other half constitutes a complete stop-cock on the end of the pipe, or upon fitting an intermediate section of a line of pipe in place the water in the supply-section may be cut off while the work is in progress. The coupling takes the place of a union and a stop-cock and may be adapted to any angle from a straight run to a full miter. When the coupling is made altogether of brass, it may be used as an angle-stop for a radiator. The parts of the device are readily united by a wrench or a like tool, and in such an event the hubs are of polygonal shape.

It is often desirable to provide an opening 22 in the member D, as shown in Figs. 3, 4, and 5, which opening is arranged to register with the opening in the key when the latter is in a cut-off position, providing a waste-outlet for backwater and serving to prevent freezing in cold weather.

Having thus described my invention, I claim as new and desire to secure by Letters Patent—

1. A coupling comprising two members capable of turning one in the other, and a key mounted to turn in both members, and capable of establishing communication between the members, or of cutting off communication, as described.

2. A coupling comprising two members mounted to turn one upon the other, each member being provided with a hub, one of said members having a chamber therein communicating with its hub, and an opening in its inner and its outer faces, the other member of the coupling being provided with a barrel in communication with its hub, and a key closed at top and bottom, mounted to turn in the two members, the key being provided with an interior chamber having an opening communicating with the outlet of the barrel, and an opening communicating with the interior of the chambered member, as and for the purpose specified.

3. In a coupling, the combination, with opposing members held to turn one in the other, each member being provided with a hub, one member having an interior chamber in communication with its hub and an opening in its inner and in its outer face, the opening in the inner face having its wall beveled, the opposing member of the coupling being provided with a barrel in communication with its hub, and a projection arranged to enter the inner opening of the chambered member, the projection being tapered correspondingly to the taper of said opening, of a key held to turn in the barrel of one member, being made to extend through the outer opening in the opposing member of the coupling, the said key being closed at its ends and having one of its ends threaded to receive a nut, the key being provided also with an interior chamber having an opening capable of communication with the outlet of the barrel, and a double opening leading into the chamber of the chambered member of the coupling, as and for the purpose specified.

WILLIAM N. LONG.

Witnesses:
SCOTT BOZORTH,
C. W. KNOX.